United States Patent
Timusk et al.

(10) Patent No.: US 8,753,536 B2
(45) Date of Patent: Jun. 17, 2014

(54) METHOD OF PREPARATION OF SURFACE COATING OF VARIABLE TRANSMITTANCE AND ELECTRO-OPTICAL APPLIANCE INCLUDING THE SAME

(75) Inventors: Martin Timusk, Poltsamaa Parish (EE);
Martin Järveküllg, Vilijandi (EE);
Kristjan Saal, Ülenurme Parish (EE);
Rünno Lõhmus, Tartu (EE); Ilmar Kink, Tartu (EE); Ants Lõhmus, Tartu (EE)

(73) Assignees: University of Tartu, Tartu (EE);
Estonian Nanotechnology Competence Centre, Tartu (EE)

( * ) Notice: Subject to any disclaimer, the term of this patent is extended or adjusted under 35 U.S.C. 154(b) by 91 days.

(21) Appl. No.: 13/260,067

(22) PCT Filed: Mar. 25, 2010

(86) PCT No.: PCT/EP2010/053939
§ 371 (c)(1),
(2), (4) Date: Sep. 23, 2011

(87) PCT Pub. No.: WO2010/108987
PCT Pub. Date: Sep. 30, 2010

(65) Prior Publication Data
US 2012/0019760 A1     Jan. 26, 2012

(30) Foreign Application Priority Data
Mar. 25, 2009   (EE) .................................. 200900022

(51) Int. Cl.
*B05D 3/10*   (2006.01)
*B05D 5/12*   (2006.01)
*C09K 19/54*  (2006.01)
*C09K 19/58*  (2006.01)
*G02F 1/1334* (2006.01)
*G02F 1/1343* (2006.01)

(52) U.S. Cl.
USPC ... 252/299.01; 427/124; 427/123; 252/299.5; 349/88; 349/92; 349/93; 349/138

(58) Field of Classification Search
USPC .................... 252/299.01, 299.5; 428/1.1, 1.5; 349/88, 92, 93, 138; 427/123, 124
See application file for complete search history.

(56) References Cited

U.S. PATENT DOCUMENTS 7,817,333 B2 * 10/2010 Chen .............................. 359/321

FOREIGN PATENT DOCUMENTS

WO     WO 2007104818 A1 *  9/2007

OTHER PUBLICATIONS

D. Levy et al.: "Color Displays with Gel-Glass Dispersed Liquid Crystals", J. Sol-Gel Sci. and Tech., vol. 8, 1997, pp. 1063-1066.*

*Primary Examiner* — Shean C Wu
(74) *Attorney, Agent, or Firm* — Birch, Stewart, Kolasch & Birch, LLP

(57) ABSTRACT

Method of preparation of surface coating of variable transmittance and an electro-optical layered appliance including the same comprises dispersing of liquid crystal microdroplets in hydrolyzable and polymerizable precursors and applying obtained mixture on a surface by spraying. Applying the material to the surface by spraying is intrinsically related to the synthesis processes because the properties of the surrounding environment (i.e. content of water and acidity, UV radiation) and the chemical reactions that take place during spraying have considerable influence on the properties (i.e. driving voltage, thickness of obtained layer). Obtained layered appliance comprises of a matrix material with dispersed microdroplets of liquid crystal obtained by the described method, electrically conductive transparent electrodes with contacts, a dielectric material, substrate and covering layers.

20 Claims, 2 Drawing Sheets

METHOD OF PREPARATION OF SURFACE COATING OF VARIABLE TRANSMITTANCE AND ELECTRO-OPTICAL APPLIANCE INCLUDING THE SAME

TECHNICAL FIELD

The invention relates to the field of chemical technology and optics, more specifically to preparation of electro-optical coatings, preferably of variable transmittance, by sol-gel method, and involves dispersing of liquid crystal microdroplets in hydrolyzable and polymerizable precursors, as a result of which a composite material is obtained, with the light transmittance variable upon the application of electric field. The electro-optical material prepared by this method is named gel-glass dispersed liquid crystal (further on abbreviated as GDLC).

BACKGROUND ART

Electro-optical materials are materials with optical properties that can be changed by electric field. There are two types of electro-optical materials with very similar principle of operation, the manufacturing process and precursors for which are conceptually different. It was discovered in the year 1985 that a polymer material with liquid crystal dispersed in it as microdroplets can have electro-optical properties. Such material is named Polymer Dispersed Liquid Crystal, or PDLC. (J. L. Fergason, *Polymer encapsulated nematic liquid crystals for display as light control applications*, SID Int Symp. Digest Technol. Papers 16 (1985)). PDLC materials are also manufactured industrially.

PDLC-materials are composite films, where the micro-dimensioned droplets of nematic liquid crystals are dispersed in the organic polymer matrix. The droplets of liquid crystal are located within the matrix randomly, and their diameter is close to the wavelength of visible light, which causes strong scattering of light in the visible spectrum. The liquid crystal droplet formation mechanism lies in the phase separation occurring in the homogenous mixture of polymer precursor and liquid crystal. Phase separation may be induced by polymerization, decreasing the temperature (temperature-induced phase separation), or by solvent evaporation from the solution (solvent-induced phase separation). PDLC materials are manufactured industrially, but their main shortcomings are insufficient photostability (e.g., decomposition of the matrix under the influence of UV radiation), limited selection of precursors and high cost.

PDLC materials deserve to be mentioned in the context of this invention only because in the course of searching for the alternatives to PDLC it was found in 1991 that materials with the similar principle of operation, in which the droplets of liquid crystals are located inside a solid matrix, can also be prepared by sol-gel method (D. Levy, C. J. Serna, J. M. Otón, *Preparation of Electro-optical Active Liquid Crystal Microdomains by the Sol-Gel Process*, Mat. Lett. 10(9-10) (1991) 470-476, patent ES2137065 Procedimiento de preparación de matrices vítreas con propiedades de cristales líquidos a temperature ambient, 1999).

GDLC-s are a class of hybrid electro-optical film materials, manufactured by sol-gel method, which consist of a solid inorganic glass or organically modified inorganic glass matrix and the liquid crystal microdroplets dispersed in it. GDLC material is a solid microemulsion, since it consists of mutually insoluble solid and liquid phases. Since the use of inorganic glass as matrix, the photostability is not a problem in the case of GDLC materials.

In PDLC and GDLC materials the electro-optical effect is induced by placing the material between the two electrically conductive transparent electrodes. Thin-films of indium tin oxide are conventionally used as the electrodes. When no voltage is applied to electrodes, then, depending on the temperature and forces between the molecules of liquid crystals and the matrix boundary surface, the orientation of molecules of liquid crystals is different in different micropores, however, if electric field of sufficient strength is applied, then the molecules of liquid crystal polarize electrically and change orientation until the average orientation of molecules coincides with the direction of the external field. The liquid crystal and glass matrix are selected so that the liquid crystal's ordinary refractive index would be very close to the refractive index of the glass matrix. In this case, when electric field is applied to the film, the refraction indices of glass matrix and the effective refraction index of liquid crystal coincide, so there is no refraction and scattering of light in the material, thus the material is transparent. When no electric field is applied to the material, then the orientation of the liquid crystal molecules in different droplets is different due to thermal energy and forces between liquid crystal molecules and the pore surfaces. In this case the direction of incident light is at different angles to the orientation of liquid crystal molecules in different droplets and the refraction index of the liquid crystal for a specific ray of light does not match the refraction index of glass matrix. Thus refraction occurs and light is scattered.

In order to maximize the optical contrast of the material, the refractive index of the matrix must be equal to the refractive index of the nematic liquid crystal in the direction of its isotropic axis. However, the last is as a rule considerably higher than a refractive index of usual silicate glass (~1.43), which is obtained by using the most common sol-gel precursors—silicon alkoxides. Increasing the refractive index of the matrix to the necessary range is resolved by using the alkoxides of other metals, the oxides of which have a high refractive index, as the precursors, or mixing them with other alkoxides, for example, with silanes. One of the precursors used in mixture with silanes for increasing the matrix refractive index is titanium ethoxide $Ti(OCH_2CH_3)_4$. (Win-Pin Chang, Wha-Tzong Whang, Jaw-Ching Wong, *Electrooptic Characteristics of amino-gel-glass-dispersed liquid crystal and its matrix formation*, Jpn. J. Appl. Phys. 34 (1995) 1888-1894, U.S. Pat. No. 5,702,636 Gel-glass dispersed liquid crystals). The disadvantage of this method is the fact that the material preparation process has to be carried out in a special chamber with controlled humidity. Barium ethoxide $Ba(OC_2H_4OC_2H_5)$ is also used (M. Hori, M. Toki, *Electro-optical properties of inorganic oxide/liquid crystal composite film by sol-gel process*, Journal of Sol-Gel Science and Technology 19 (2000) 349-352). In this case, for obtaining liquid crystal droplets in solid glass matrix, first the porous matrix with the necessary refractive index was prepared, and liquid crystal was inserted into the pores by vacuum infiltration instead of obtaining liquid crystal droplets in the matrix directly through phase separation from a homogeneous mixture of alkoxide-based precursor and liquid crystal (as was done in the methods described above). Latter method is complicated, because it consists of many stages and needs the application of vacuum and is therefore relatively expensive. At the same time the mentioned technical solution is only a distant analogue of the present invention.

The technology of bringing the refractive index of the matrix to the necessary value is extremely complicated due to the fact that the reactivity of suitable compounds (alkoxides of titanium, hafnium, zirconium, tin, strontium and other similar metals) is very high. The rate of hydrolysis and polymerization reactions of these compounds is by one order of magnitude greater than the corresponding reaction rates of silicon alkoxides. As a result of high reaction rate, the liquid crystal phase separation process, which requires certain gelation speed of the material so that liquid crystal droplets of optimal size could be formed, is greatly disturbed. State of art in this technological field does not provide a solution to this problem, which could ensure the simplicity of the process, necessary for the industrial manufacturing of the material. The present invention solves this problem.

The refractive index of the material prepared by the sol-gel method may be increased also by adding compounds that contain aromatic rings into the matrix (M. Oubaha, R. Copperwhite, B. Murphy, B. Kolodziejczyk, H. Barry, K. O'Dwyer, B. D. MacCraith, *Development of photo-patternable organo-mineral hybrid films from the sol-gel condensation of alkoxysilanes, Thin Solid Films* 510 (2006) 334-338), for example using phenyltriethoxysilane as one of the precursors. Such approach is not appropriate in situations where it is necessary to achieve such dielectric constant, electrical conductivity or porosity value of the matrix material, which cannot be achieved by using alkoxides that contain aromatic ring. The present invention solves this problem.

Electro-optical effect can also be achieved without matching refractive indices of matrix and liquid crystal (WO2007104818A1 Preparation of variable-transmittance coatings and assembled GDLC electro-optical devices), but due to purely physical reasons the change of transmittance on applying electric field is then smaller than it could be, if the corresponding refractive indices were equal. In addition, the need for matching the ordinary refractive indices of liquid crystal and matrix is smaller, when the concentration of liquid crystal droplets is very high so that the distance between the liquid crystals droplets is less than the light's wavelength (Paul S. Drzaic, *Liquid Crystal Dispersions, World Scientific*, Teaneck, N.J., 1995) and the film thickness is small. In applications where these conditions are not met, bringing the matrix refractive index to a necessary value is of key importance.

From the application point of view a very important material parameter is the driving voltage that is needed for switching a film of unit thickness from the opaque state to the transparent state. One of the essential factors that affect the driving voltage is the anchoring force of liquid crystal molecules on the pore surface. Anchoring forces and consequently the driving voltage for given material is modified by chemical functionalization in which such precursors as organically modified alkoxides, the non-hydrolizable groups of which remain on the surface of pores (M. Zayat, D. Levy, *Surface Organic Modifications and the Performance of Sol-Gel Derived Gel-Glass Dispersed Liquid Crystals (GDLCs), Chem. Mater.* 15 (2003) 2122-2128 and the patent application WO2007104818A1 Preparation of variable-transmittance coatings and assembled GDLC electrooptical devices).

The driving voltage may also be decreased by increasing the electric conductivity and the dielectric constant of the matrix (Win-Pin Chang, Wha-Tzong Whang, Jaw-Ching Wong, *Electrooptic Characteristics of amino-gel-glass-dispersed liquid crystal and its matrix formation, Jpn. J. Appl. Phys.* 34 (1995) 1888-1894, M. Hori, M. Toki, *Electro-optical properties of inorganic oxide/liquid crystal composite film by sol-gel process, Journal of Sol-Gel Science and Technology* 19 (2000) 349-352).

The present invention describes a novel method for decreasing the driving voltage by enabling the decrease of surface roughness of the matrix encapsulating the liquid crystal droplets.

From the part of the essence of solved problem the closest solution (prototype) to the present solution is WO2007104818A1 Preparation of variable-transmittance coatings and assembled GDLC electrooptical devices, in which the gel-glass dispersed liquid crystal material is obtained by mixing hydrolyzable alkoxides that subsequently polymerize, water, acid and liquid crystal in the appropriate ratio. The critical points in controlling the preparation process in corresponding method are the amount of solvent and its composition, the choice of precursor compounds according to their reactivity and adding a very precise amount of nitric acid, which performs as a catalyst in hydrolysis and polymerization reactions. An essential disadvantage of this method is limited shelf-life of the sol. The latter is caused by the presence of the catalyst in the precursor even when the coating procedure is not performed. The short stability time of prepared precursor hinders the industrial manufacturing of the material, especially in the case when synthesis and coating procedures are not subsequently carried out in the same place. In the context of the given invention, the precursor that is used for coating is a mixture of the alkoxides, which is up to 70% hydrolyzed, contains one or several different solvents, whether resulting from the chemical reactions or specially added, liquid crystal, whether homogenously dissolved or in the form of emulsion or in the form of suspension, and different dopants (e.g. dyes, nanostructures). In the case of higher extent of hydrolysis the properties of precursor gradually worsen and applying the material onto the substrate as a uniform film becomes difficult due to too high viscosity of the precursor.

The present invention is applicable in mass production, for preparing surface coatings of electrically variable transmittance. Unlike the prototype, in the case of the given invention there is no limitation to the shelf-life of the precursor due to the presence of the catalyst (the acid). This can potentially make the manufacturing process more economical by making it possible to prepare larger batches of precursor.

With the purpose of elaborating an analogue to LCD, dye doped GDLC materials have been prepared (D. Levy, F. Del Monte, X. Quintana, J. M. Otón, Color Displays with Gel-Glass Dispersed Liquid Crystals, Journal of Sol-Gel Science and Technology 8 (1997) 1063-1066). The advantage of such display would be the absence of polarizers but this technology also suffers from a problem of dye contamination that has not been overcome yet. It is inevitable with this method that when one of the GDLC phases (matrix or liquid crystal) is doped with a dye, it is also in some extent present in the other (liquid crystal or matrix, respectively). Present invention solves this problem, enabling the addition of liquid crystal into the matrix in the form of solid particles, while the liquid crystal is previously mixed with a dye in a liquid phase.

DISCLOSURE OF INVENTION

The object of this invention is a method of preparation of coating of electrically variable transmittance, which involves dispersing of liquid crystal particles in hydrolyzable and polymerizable precursor and which is applicable for preparation of electro-optical coating and coating surfaces with different shape. Described method combines preparation of surface coating material of variable transmittance and applying it on a surface (for example, manufacturing of window glass of a variable transmittance), where the process of applying the material to the surface is intrinsically related to the synthesis processes of the GDLC material.

The present method describes a novel solution to the procedure of adding water and to simultaneous adding of water and catalyst to the hydrolyzable and polymerizable precursor mixture in order to obtain coatings of variable transmittance. The present invention describes a solution for preparing coating of variable transmittance on large substrate areas.

To achieve the objective of the invention different alkoxides, liquid crystal and an appropriate amount of solvent are mixed together. After that the obtained material, or precursor, is sprayed through water vapor environment/atmosphere with certain acidity on the substrate (for example, quartz, silica glass) that is coated with a layer that is electrically conductive, but transparent in the visible range. While moving through humid and acidic environment, hydrolysis and polymerization reactions of the alkoxides and evaporation of the solvents take place. These processes also continue on the surface of the substrate. In the course of spraying the carrier gas jet induces underpressure in the vessel with the prepared mixture and carries the liquid mixture along. The carrier gas may be the dry gas (for example, the pure argon or nitrogen) or some mixture of gases with certain humidity (for example, air). To improve the effectiveness of the process during the period, when the mixture has left the spraying device, but has not yet reached the surface, the mixture is exposed to radiation (e.g. ultraviolet radiation), increasing the reaction speed.

The alkoxides, which as the result of hydrolysis and polymerization processes form a solid glass matrix, are chosen so that the catalyst (acid) is also formed within the mixture through the hydrolysis of alkoxide compounds, i.e. in contact with water. For this purpose one of the precursor compounds used may be for example trimethylchlorosilane, which gives one mole of hydrochloric acid by the reaction of one mole of alkoxide and one mole of water. When such precursors are used the hydrolyzable and polymerizable precursors come in contact with catalyzing agent as the mixture is applied onto the surface, moving through the acidic water vapor. Catalyzing acid also forms in the precursor mixture through the reaction between alkoxide(s) and water vapor. Such method of adding catalyzing acid and water in the course of preparation of the coating enables controlling the speed of alkoxide hydrolysis and polymerization processes and the relative time difference between the starting points of these processes in a wide range and thus enables tuning of the properties of obtained material (the size of liquid crystal droplets and droplet size distribution).

The liquid crystal is mixed with hydrolyzable and polymerizable precursors in two different ways. In the first case the liquid crystal is mixed as a liquid phase, i.e. homogeneous solution is obtained by mixing liquid crystal with a mixture of alkoxides and solvent at room temperature. In this case the processes leading to phase separation start already in the microdroplets of homogeneous mixture before the material reaches the surface. The phase separation is caused by the evaporation of solvents and polymerisation, resulting in reduction of the solubility of liquid crystal and formation of liquid crystal droplets. In the second case the liquid crystal in the form of solid particles or powder is mixed with the alkoxides. In this case the liquid crystal microdroplets in the solid form are already present in the initial mixture before spraying the material to the surface, no phase separation occurs. The material synthesis process is carried out at a temperature, which is lower than the operating temperature range of the resulting material. The liquid crystal is chosen so that the melting temperature of the liquid crystal is higher than the temperature at which the sol-gel processes are carried out. Such liquid crystal may be, for example, 4-pentyl-4-biphenylcarbonitrile, or 5CB, the phase transformation temperature from solid to liquid for which is ca 23° C. (S. Sinton, A. Pines, *Study of Liquid Crystal Conformation by Multiple Quantum NMR: n-pentyl Cyanobiphenyl*, Chem. Phys. Lett. 76, 263-267 (1980)). It should be noted that, as a rule, in a small volume, ca. cubic micrometer or less, the phase transformation of liquid crystal takes place at a lower temperature than in a larger volume, for example, in a milliliter. In order to avoid dissolution of the solid liquid crystal particles in the solution of alkoxides and solvent, in addition to the use of low-temperature synthesis the amount of the solvent should be minimized. (It is possible to synthesize the material even without the addition of solvent to the alkoxides. Besides, it should be taken into account that solvent is also created in the course of chemical reactions in the mixture.) Also, alkoxides in which the solubility of liquid crystal is minimal should be used. For example, phenyltriethoxysilane as one of the constituents of the sol mixture.

In the case of adding liquid crystal in the form of solid particles, the liquid crystal in liquid form is first mixed with a dye in appropriate ratio. Then the homogeneous mixture of liquid crystal and dye is processed into a powder. In order to dope the matrix without contaminating the liquid crystal phase, the dye is first mixed with the alkoxides and powder of solid particles of pure liquid crystal is added subsequently.

Adding solid liquid crystal powder to the material has a number of advantages over the use of phase separation process, for example, in addition to the possibility of selectively doping only one of the phases, alkoxides with much higher reactivities (higher speed of hydrolysis and polymerization) compared to those of the conventional silica compounds can be used as precursors. Sol-gel precursors of titanium or other metal oxides which have high refractive indexes may be used, while it does not influence the size of the liquid crystal droplets.

Thus adding a liquid crystal into material in a solid or powder form at the same time serves as a complex solution for a problem of increasing the refractive index of the matrix. At the same time the pore surface microstructure is largely independent from the selection of matrix-forming precursors and their reaction rates, whereupon these parameters cannot cause significant increase of driving voltage. At the same time liquid crystal is fully used, since, as compared to the phase separation process, where a significant part of the liquid crystal can remain solved in the glass matrix, 100% of the liquid crystal powder particles form droplets. Therefore this method guarantees economical use of liquid crystal and, consequently, the lower price of the product.

Described method has a number of advantages compared to the closest analogue. Part of the solvent evaporates already during the coating process, so thicker films can be prepared without cracking the driving voltage of the material prepared by this method is lower compared to a film of the exact same composition that is prepared by spin coating or dip coating. This is due to the fact that the ratio of solvent evaporation to material polymerization in case of spraying is different from, for example, the case of spin coating. Consequently the pore surface roughness is lower and hence the driving voltage lower. The advantage of spraying method used in the invention compared to spin coating is revealed in lower material consumption, by spin coating a large proportion (up to 98%) of the material is forced off the surface during coating procedure (P. Haaland, J. McKibben, M. Paradi, *Fundamental Constraints on Thin Film Coatings for Flat Panel Display Manufacturing*, Proceedings of the Display Manufacturing Technology Conference (San Jose:SID, 1995), 79-81).

Accordingly, the use of the present invention allows improved cost-effectiveness of GDLC production and coating of large surfaces. When liquid crystal is mixed with alkoxides in its liquid form, the phase separation of liquid crystal starts already before the sprayed material has reached the surface that is being coated. In addition, the mechanical stresses present in the gel material are much smaller compared to the situation where phase separation takes place in the homogenous mixture of hydrolyzing and polymerizing precursor and liquid crystal only after a layer of the mixture layer is applied to the surface. This fact makes it possible to prepare thicker films without cracking of the material.

Another advantage of described method is that acid (catalyst) and water are added in the course of applying the material to the surface, while some of the acid is produced as the result of chemical reactions within the precursor itself as the material is applied to the surface, the viscosity change of the solution of alkoxides and liquid crystal after the components have been mixed does not present a problem. This simplifies the industrial application of the method and the controllability of the manufacturing process considerably. The method is suitable for coating large surfaces (e.g. window glasses) with electro-optical films and also allows the preparation of electro-optical films with different patterns and shapes (e.g., ads, trademarks, decorations), using masks of corresponding shape during the film preparation process.

By described method an appliance with a layered structure is prepared (a glass with variable transparency), which consists of:
1) a substrate material, which is transparent in the range of visible wavelengths (for example, silica glass, quartz, polymethylmethacrylate or other transparent polymer material),
2) an electrode, which is made of a material that is electrically conductive and transparent in the range of visible wavelengths (for example, indium-tin oxide, electrically conductive polymer, a thin metal film, for example, 3 to 15 nanometers thick gold),
3) a matrix, which contains liquid crystal (electro-optical coating),
4) dielectric material, for example, organic resin
5) another transparent electrode, which in case the matrix material is dielectric, could be deposited directly onto the matrix, and
6) a layer, covering the whole structure (further on the covering layer), which is prepared from the same material as the substrate. The covering layer protects the thin films against mechanical damage. In case of absence of threat for mechanical damage, the covering layer is not needed, as in case of the inner surface of double-glazing.

The metallic electrode with a thickness of 3 to 15 nanometers ensures that the metal layer is not too thin, and consequently its electrical resistance is not too high, or too thick, which would lead to unreasonably high absorption of light in the metal layer (M. S. R. Khan, A. Reza, *Optical and electrical properties of optimised thin gold films as toplayer of MIS solar cells, Appl. Phys. A* 54 (1992) 204-207). The thin metal films are also colored. For example, the thin gold films are greenish. Using a thin metal film as an electrically conductive transparent electrode makes it possible to add color to the device. At least one electrode could be liquid, for example electrolyte.

Matrix material, according to the described method, is applied to the surface in three different ways. In the first case the matrix containing liquid crystal laterally fills the entire remaining part between transparent electrode and dielectric material layer (see FIG. 1). In the second case the matrix material is applied to the surface in a way that matrix containing liquid crystal fills the area between the transparent electrode and the dielectric material layer laterally only partly, while the other part between electrodes is filled with dielectric material (see FIG. 2). In the third case the matrix material is applied to the surface so that part of the matrix contains particles of liquid crystal, while the remaining part does not, and the same composition is used for the both parts of the matrix (see FIG. 3). The second electrode can also be located directly on top of the matrix material (see FIG. 4.) The electrically conductive films are supplied with metal contacts.

The appliance prepared by described method consists of a number of stacked layers of materials on a substrate and where one of the layers is a complex layer composed of electro-conductive transparent material, matrix containing liquid crystal, matrix not containing liquid crystal, and/or layer of dielectric material and a second transparent electrode. On these layers lies the dielectric material, for example organic resin, and covering layer. Electro-conductive and transparent layers each have independent voltage applying contacts (one contact may be common, for example the ground one). The layered appliance prepared by described method has the aforementioned layered structure, which lies on both sides of the substrate.

The necessity of using dielectric material, for example organic resin, arises from the use of electrode coated covering layer with the aim fill the gap between the matrix containing liquid crystal and transparent electrode and the covering layer lying on it. As a result, the driving voltage is reduced, because electric field is not applied on the (air)gap, the electrical conductivity of which is orders of magnitude lower than electrical conductivity of the matrix, which contains the droplets of liquid crystal. Also there the danger of electrical breakdown on applying voltage is eliminated, and the optical contrast of the appliance is improved since no light scatters from the matrix surface. When conductive layer, for example electrolyte, thin metal film, conductive polymer, is deposited directly on top of the matrix layer, the need for dielectric layer between the two is eliminated.

The advantage of using thin gold film as transparent electrode is also the chemical stability. When electro-optical film is applied on substrate, covered with electro-conductive film, some liquid crystal droplets come into contact with conductive film and the forces between the liquid crystal molecules and gold film, are smaller than in the case of, for example, indium-tin oxide. Therefore the strength of electric field that has to be applied to the electro-optical material to change its transmittance is lower.

BRIEF DESCRIPTION OF DRAWINGS

The preparation of electro-optical surface coating of variable transmittance in accordance with the invention is explained through following examples, as well as the description of the layered variable transmittance appliance, which contains electro-optical surface coating of variable transmittance, with references to the added drawings, where in FIG. 1 there is schematically shown the layered structure of appliance of variable transmittance, which contains the electro-optical coating of variable transmittance prepared by the described method.

BEST MODE FOR CARRYING OUT THE INVENTION

Figure 1:
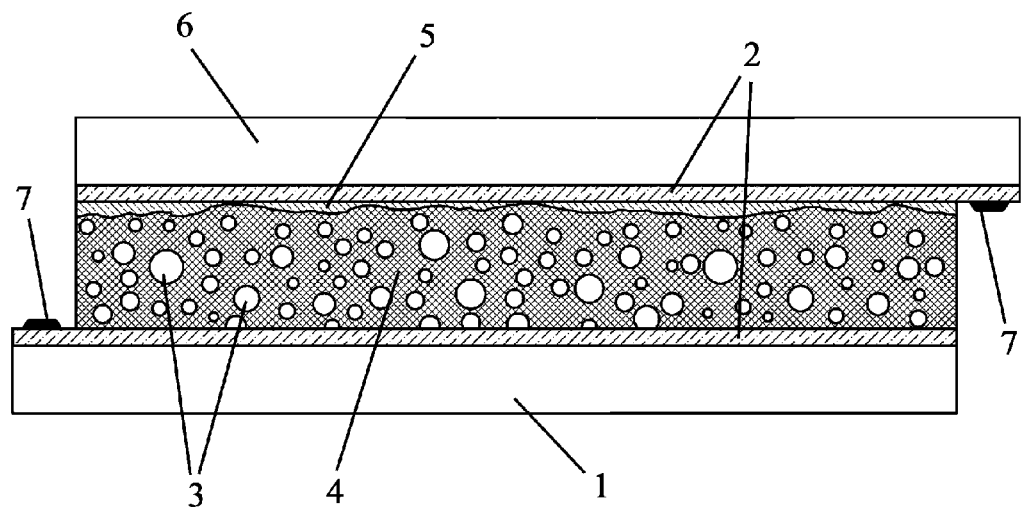

FIG. 1 schematically shows the structure (embodiment) of the variable transmittance appliance of layered structure, which contains electro-optical surface coating of variable transmittance prepared by the described method, where are shown substrate 1, transparent electrodes 2, liquid crystal containing part 3 of matrix 4, which laterally fills the entire remaining area between electro-conductive transparent electrodes, dielectric material (e. g. organic resin) 5 and covering layer 6. The electrodes are supplied with electrical contacts 7.

Figure 2:
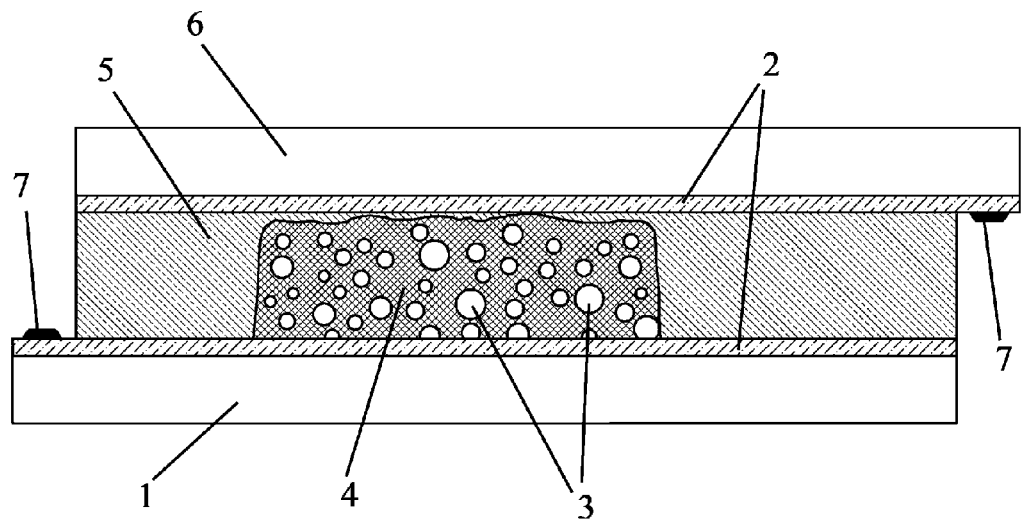
in FIG. 2 there is schematically shown the next example of the appliance of layered structure, obtained by the described method.

FIG. 2 schematically shows the structure (embodiment) of the variable transmittance appliance of layered structure, represented in FIG. 1, obtained in accordance with the invention, where the liquid crystal containing part of matrix 4 only partly laterally fills the area between electro-conductive transparent electrodes, while the remaining part is filled with dielectric material 5, for example organic resin.

Figure 3:
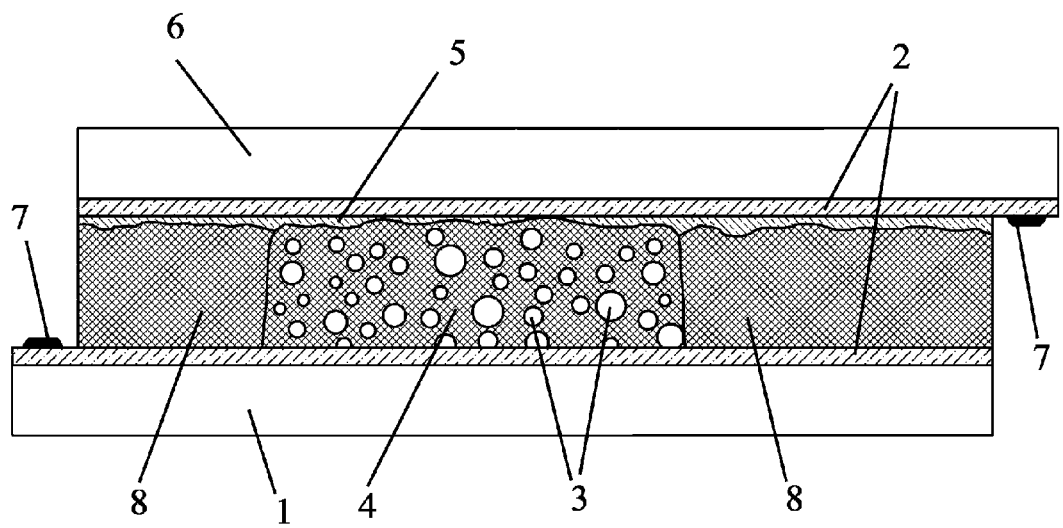
in FIG. 3 there is schematically shown the next example of the appliance of layered structure, obtained by the described method.

FIG. 3 schematically shows one more structure (embodiment) of the variable transmittance appliance of layered structure, represented in FIG. 1, obtained in accordance with the invention, where a part of liquid crystal containing matrix 4 laterally fills only the part of the area between electro-conductive transparent electrodes, while the other part is filled with matrix 8 of the same composition, but without liquid crystal. Layer of dielectric material 5, for example organic resin, is applied both on layers with and without the liquid crystal.

Figure 4:
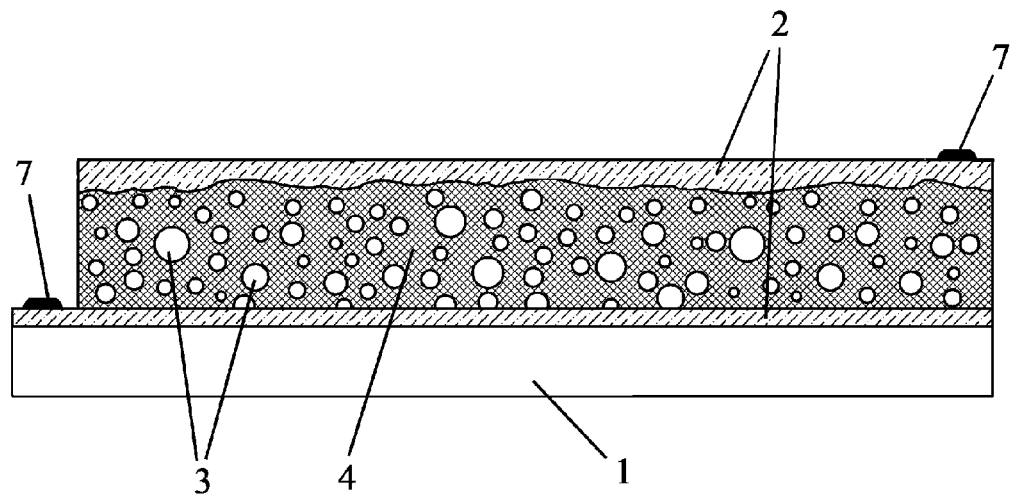
in FIG. 4 there is schematically shown one more example of the appliance of layered structure, obtained by the described method.

FIG. 4 schematically shows one more structure (embodiment) of the variable transmittance appliance of layered structure, obtained in accordance with the invention, where a part of liquid crystal containing matrix 4 laterally fills the area between, and is in the direct contact with electro-conductive transparent electrodes.

EXAMPLES

Example 1

2.138 ml of tetraethoxysilane, 636 µl of methyl-triethoxysilane, 559 µl of 100% ethanol, 430 µL of water containing 3.688% of nitric acid, and 237 µl of 5CB liquid crystal are mixed together at room temperature (23° C.). The mixture is sprayed at room temperature with argon as carrier gas through an acidic water vapor atmosphere onto a glass plate coated with indium-tin oxide film. Nitric acid is used as an acidic agent. Spraying is carried out over a vessel with acidic water at 40° C. temperature. Evaporation of solvent, hydrolysis and polymerization reactions of alkoxides result in phase separation and formation of liquid crystal droplets. The sprayed film is left aging for a day at room temperature and is then heated in an oven at 50° C. for 48 h. After that, the surface of the sprayed film is covered with Epotek 301-2 resin, and, before the resin solidifies, another glass plate covered with indium-tin oxide film is pressed upon.

Example 2

2.363 ml of tetraethoxysilane, 703 µl of methyl-triethoxysilane, 54 µl of chlorotrimethylsilane, 618 µl of 100% ethanol, and 262 µl of 5CB liquid crystal are mixed together at room temperature (23° C.). The mixture is sprayed at room temperature using argon as carrier gas through saturated acidic water vapor atmosphere to a glass plate covered with indium-tin oxide film. Nitric acid is used as an acidic agent. Spraying is carried out over a vessel with acidic water, the temperature of which is 100° C. Evaporation of solvent, hydrolysis and polymerization reactions of alkoxides result in phase separation and formation of liquid crystal droplets. The sprayed film is left aging for a day at room temperature and is then heated in an oven at 50° C. for 48 h. After that, the surface of the sprayed film is covered with Epotek 301-2 resin, and, before the resin solidifies, another glass plate covered with indium-tin oxide film is pressed upon.

Example 3

2.163 ml of tetraethoxysilane, 50 µl of chlorotrimethylsilane, 881 µl of titanium butoxide, 610 µl of phenyl-triethoxysilane, and 262 µl are mixed together at 8° C. 0.242 g of 5CB liquid crystal powder is added to the mixture, to which 0.25 weight percent of dichromate anthraquinone blue dye has been added in advance. The prepared suspension is sprayed at 8° C. in argon as carrier gas through saturated acidic water vapor atmosphere to the surface of a glass plate covered with a thin gold film. Saturated acidic water vapor environment is achieved using Boneco 7136 air humidifier. The sprayed film is left to age for a day at 15° C. and relative humidity of surrounding atmosphere over 60%. Then the sprayed film is heated in an oven at 50° C. for 48 h. After that, the surface of the sprayed film is covered with Epotek 301-2 resin, and, before the resin solidifies, another glass plate covered with gold thin film is pressed upon.

Example 4

The procedure described in example 3, with the difference that one electrode is deposited directly onto the matrix. The method can be used when matrix material has dielectric properties.

Example 5

The procedure described in example 3, with the difference that at least one electrode is electrically conductive liquid.

Example 6

The procedure described in example 3, with the difference that one glass plate is mechanically tied to layered structure while the other one is not. For example, the inner surface of double-glazing operates as covering glass.

Example 7

The procedure described in example 3, with the difference of the suspension sprayed through a mask to a substrate covered with an electrode transparent in the visible light range. The sharpness of the edges of the obtained images depends on the distance between the mask and the substrate.

The invention is applicable in building constructions for production of window glasses with variable transmittance (including the colored glasses), glass doors, glass partition walls, various signs with shape changing and blinking images, which are used for information and warning, as well as for advertisements.

The invention makes it possible to manufacture electro-optical films with electrically variable transmittance for surfaces of different shapes, and at the same time the electrooptical films may themselves serve as an image applied to the surface. The mentioned technology is suitable for industrial manufacturing.

The invention claimed is:

1. A method of preparation of a surface coating of electrically variable transmittance, which comprises the steps of dispersing liquid crystal microdroplets in a mixture of an alkoxide and a solvent, and forming a hydrolyzable and polymerizable precursor, wherein said hydrolyzable and polymerizable precursor is sprayed through an acidic water vapour atmosphere on a substrate coated with an electrically conductive and transparent film, whereas a chemical reaction, by which the surface coating of electrically variable transmittance is prepared, is initiated during spraying in the acidic water vapour atmosphere during coating application, and hydrolysis and polymerization reactions of the alkoxide take place during spraying, and wherein the alkoxides form a matrix as a result of the hydrolysis and polymerization reactions.

2. The method according to claim 1, wherein one or two alkoxides are chosen to form an additional acid as a result of a chemical reaction of the hydrolyzable and polymerizable precursor and water in acidic water vapour at the time of applying the coating.

3. The method according to claim 1, wherein an homogenous mixture of alkoxide and liquid crystal microdroplets forming the hydrolyzable and polymerizable precursor is exposed to radiation during spraying, to rise the reaction speed.

4. The method according to claim 1, wherein the liquid crystal microdroplets are dispersed in the mixture of the alkoxide and the solvent to form the hydrolyzable and polymerizable precursor in a form of solid microparticles.

5. The method according to claim 1, wherein the liquid crystal microdroplets in a liquid phase are mixed with a dye, said mixture of liquid crystal microdroplets and dye is transformed into a powder form and thereafter said powder form is dispersed in the mixture of alkoxide and solvent to form the hydrolyzable and polymerizable.

6. The method according to claim 4, wherein, before dispersing of liquid crystal microdroplets in a form of solid particles in the mixture of alkoxide and solvent to form the hydrolyzable and polymerizable precursor, a dye is preliminarily mixed with the mixture of alkoxide and solvent.

7. The method according to claim 1, wherein an electrically conductive and transparent film, made from metal 3 to 15 nm thick, is applied before and after spraying the precursor to the substrate.

8. The method according to claim 7, wherein the electrically conductive and transparent metal film is applied to the substrate by the means of vacuum technology.

9. The method according to claim 7, wherein the electrically conductive and transparent metal film is applied on the substrate by a chemical reaction.

10. An electro-optical layered appliance with variable transparency, comprising a substrate, a first transparent electrode, which is supplied with an electrical contact, a surface coating of electrically variable transmittance with dispersed liquid crystal microdroplets, whereas the surface coating of electrically variable transmittance is prepared according to the method described in claim 1, at least one layer of a dielectric material, a second transparent electrode with an electrical contact and a covering layer, which are stacked one to one, characterized by preparation of the surface coating of electrically variable transmittance containing liquid crystal microdroplets between the first transparent electrode and the dielectric material, while the part between the first transparent electrode and the dielectric material partially contains the surface coating of electrically variable transmittance containing liquid crystal microdroplets and partially contains an electrically non-conductive material, containing no liquid crystal microdroplets.

11. The layered appliance according to claim 10, wherein the composition of the electrically non-conductive material is the same as the composition of the surface coating of electrically variable transmittance comprising the liquid crystal microdroplets.

12. The layered appliance according to claim 10, wherein the electrically non-conductive material is an organic resin film.

13. The layered appliance according to claim 10, wherein the several layer structures applied between the substrate and the covering layer, while the electrically conductive and the transparent layers have contacts in every layer on which independently voltage can be applied and while the different layers may have a common contact.

14. The layered appliance according to claim 10, wherein the layered structure is applied to the both sides of the substrate.

15. The layered appliance according to claim 10, wherein the first and second transparent electrodes are made of metal 3 to 15 nm thick.

16. The layered appliance according to claim 10, wherein at least one of the transparent electrodes is liquid.

17. The method according to claim 3, wherein the homogeneous mixture of alkoxide and liquid crystal microdroplets forming the hydrolyzable and polymerizable precursor is exposed to ultraviolet radiation during spraying to raise the chemical reaction speed.

18. The method according to claim 9, wherein the electrically conductive and transparent metal film is applied to the substrate by a silver mirror reaction.

19. The layered appliance according to claim 10, wherein at least one of the transparent electrodes is an electrolyte.

20. The layered appliance according to claim 10, wherein at least one of the transparent electrodes is an electrically conductive polymer.

* * * * *